April 9, 1968     E. F. WILLIAMS     3,376,610
WASTE REMOVAL FOR CARDING MACHINES
Original Filed Aug. 6, 1963     5 Sheets-Sheet 1

INVENTOR.
ERNEST F. WILLIAMS
BY
Burgess, Ryan & Hicks
ATTORNEYS

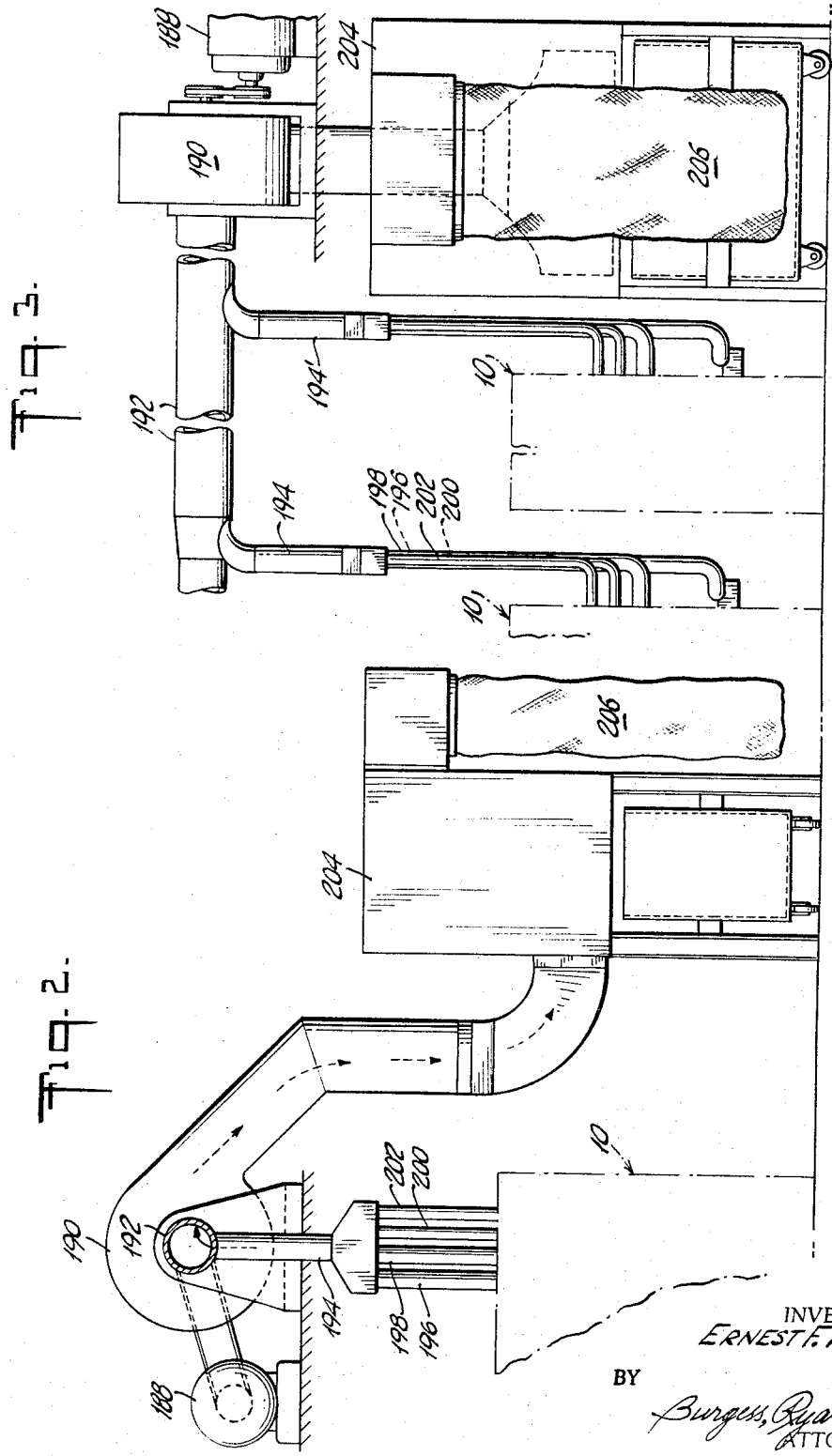

April 9, 1968     E. F. WILLIAMS     3,376,610
WASTE REMOVAL FOR CARDING MACHINES
Original Filed Aug. 6, 1963     5 Sheets-Sheet 3
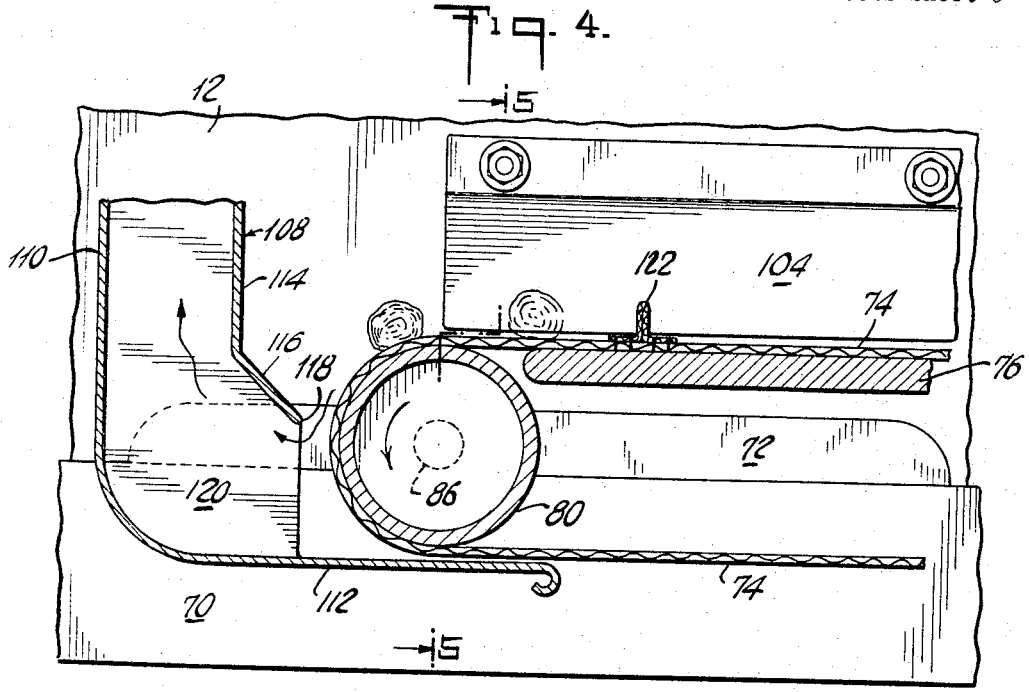
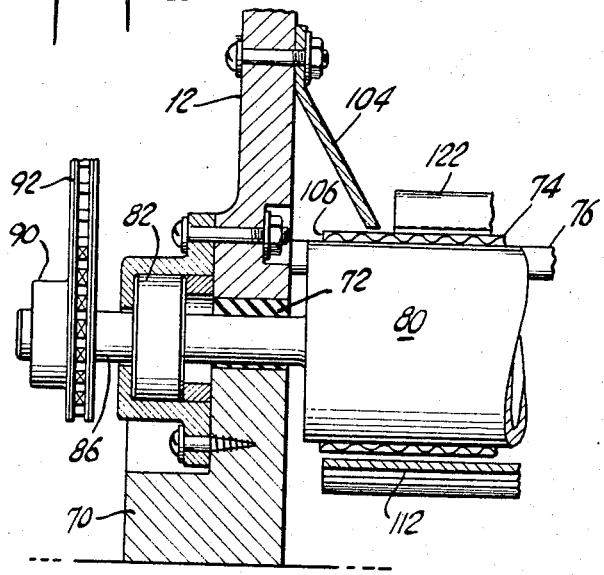
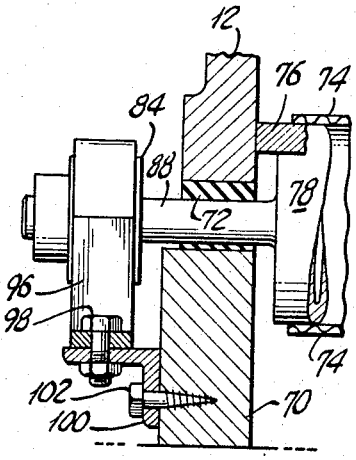
INVENTOR.
ERNEST F. WILLIAMS
BY
Burgess, Ryan & Hicks
ATTORNEYS

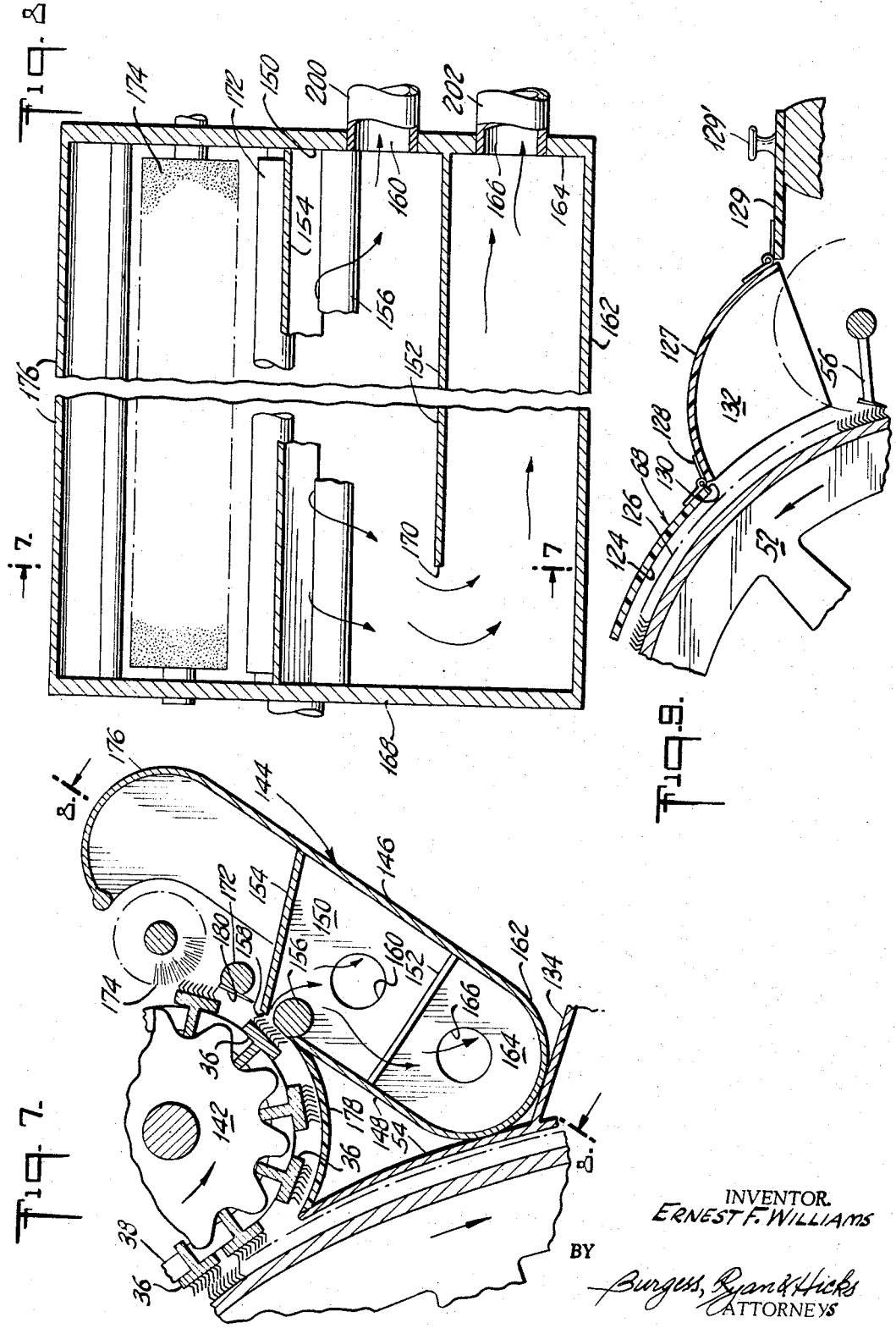

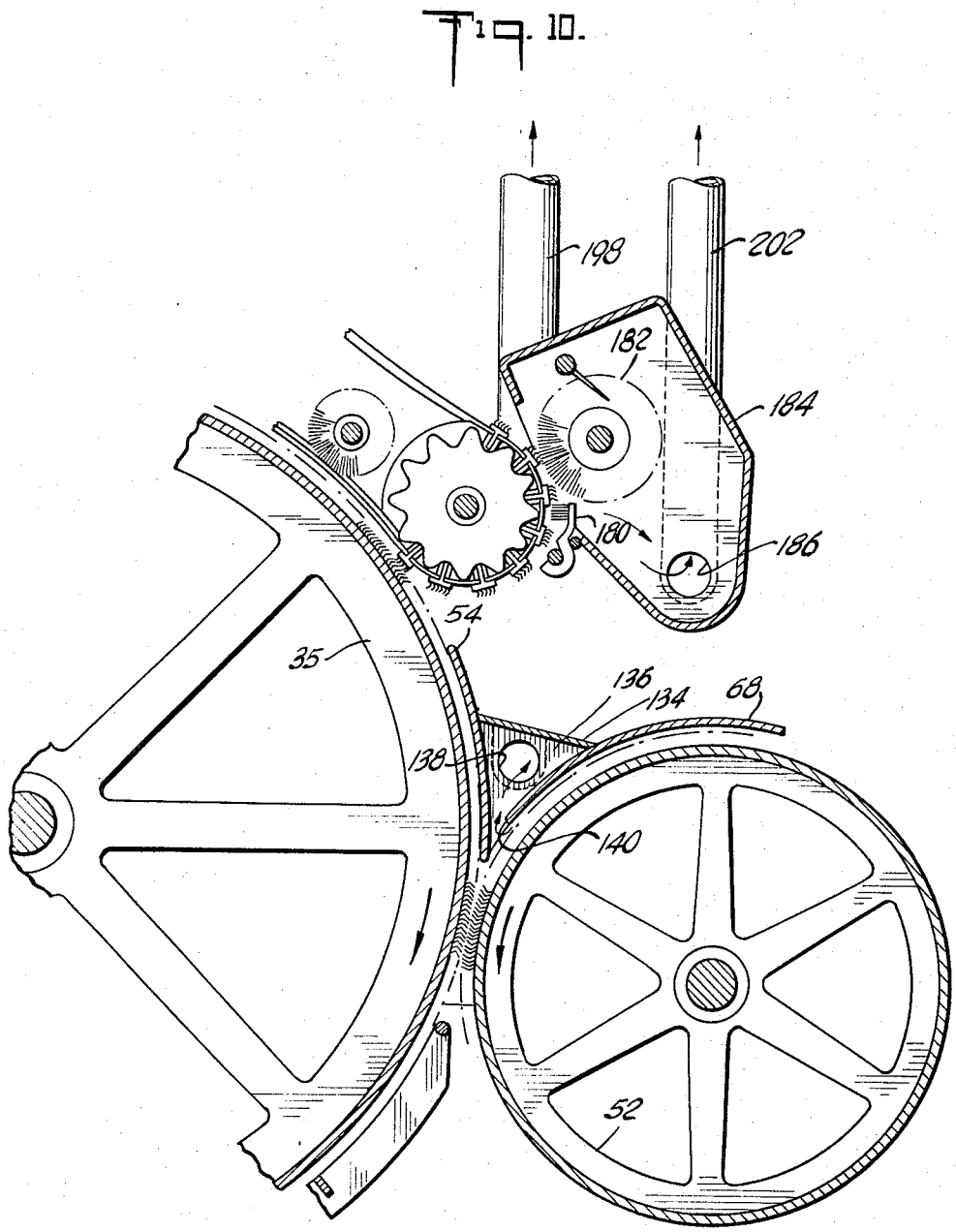

United States Patent Office 3,376,610
Patented Apr. 9, 1968

3,376,610
WASTE REMOVAL FOR CARDING MACHINES
Ernest F. Williams, Pelham, Ga., assignor to Coats
& Clark Inc., New York, N.Y., a corporation of
Delaware
Original application Aug. 6, 1963, Ser. No. 300,384.
Divided and this application Oct. 14, 1965, Ser.
No. 509,462
1 Claim. (Cl. 19—107)

ABSTRACT OF THE DISCLOSURE

An apparatus for cleaning flats at a bight in the chain of flats. A suction dust has a stripping slit extending the width of the flats at the bight and arranged both to vacuum clean the flats and to receive debris removed from the flats by a reciprocable comb and rotatable brush.

---

This is a division of application Ser. No. 300,384, filed Aug. 6, 1963, now abandoned, and relates to an apparatus and method for reducing the amount of fly released into the air around carding machines and for cleaning portions of the clothing on such machines of motes, dust, fly and flat strips.

It is an object of the invention to reduce the amount of fly in the air around carding machines.

It is a further object of the invention to prevent the accumulation of fly on carding machines and on the web of fibers produced by such machines.

It is a further object of the invention to reduce the amount of labor required to keep carding machines clean.

Still further, it is an object of the invention to separate the fly which collects under the lickerin and cylinder of a carding machine from the flat strips and to collect these wastes separately.

Carding machines process a lap or roll of cotton into a sliver. In the process they separate from the lap a quantity of foreign matter, such as leaves and dirt, as well as a quantity of short or tangled fibers. This waste material does not reach the sliver, but leaves the machine in various ways. Most of the dirt, seeds, stems, bolls, and leaves collect beneath the lickerin and cylinder of the machine on the floor within the supporting frame. This material is tangled with short fibers, and while it is light in weight does not readily float through the air. Instead it gathers in festoons and stringy masses which cling to the floor parts of the machine. Attempts to clean it from between the frame automatically by means of suction ducts have not been successful, owing to the clinging nature of this material, which prevents it from floating to the ducts. The present invention employs an endless belt disposed beneath the lickerin, cylinder, and doffer of the card machine which intercepts waste material falling from these elements and carries it to a suction duct, where it is removed from the machine.

Waste material known as "flat strips," is also removed by the clothing on the moving flats from the material being processed. Flat strips are mostly short and tangled fibers and are more valuable than the waste which falls to the floor beneath the machine. The flat strips are removed from the clothing of the flats by a reciprocating comb and by a rotary brush which removes dirt and fibers remaining in the flat clothing after the flat has passed the reciprocating comb. The present invention removes most of the flat strips from the flats by means of a suction duct, and collects in the same duct any material which is later removed by the reciprocating comb or the rotary brush. In addition, this suction duct picks up any loose fly or fibers released into the air in the neighborhood of the comb or brush.

A further source of fly is the doffer and doffer comb. The action of the doffer comb in releasing fibers from the doffer forms a delicate horizontal web and also releases particles of fly into the air. This invention captures the air containing this loose fly by creating a gentle suction above the doffer comb. The invention also cleans the clothing of the doffer by exposing it to a suction slot.

The following description and the accompanying drawings show one form of the invention.

In the drawings:

FIG. 2 is a side view of ductwork associated with the machine of FIG. 1;

FIG. 3 is an end view of the ductwork of FIG. 2;

FIG. 4 is an enlarged cross sectional view of drive roller 80 of the device of FIG. 1;

FIG. 5 is an enlarged cross section taken on cutting plane 5—5 of FIG. 4;

FIG. 6 is an enlarged cross section taken on cutting plane 6—6 of FIG. 1;

FIG. 7 is an enlarged cross sectional view taken on cutting plane 7—7 of FIG. 8 of duct 144 also shown in FIG. 1;

FIG. 8 is a cross section taken on cutting plane 8—8 of FIG. 7;

FIG. 9 is an enlarged cross sectional view of a doffer hood also shown in FIG. 1; and FIG. 10 is an enlarged view corresponding to that of FIG. 1 showing an alternative form of the invention.

Figure 1:
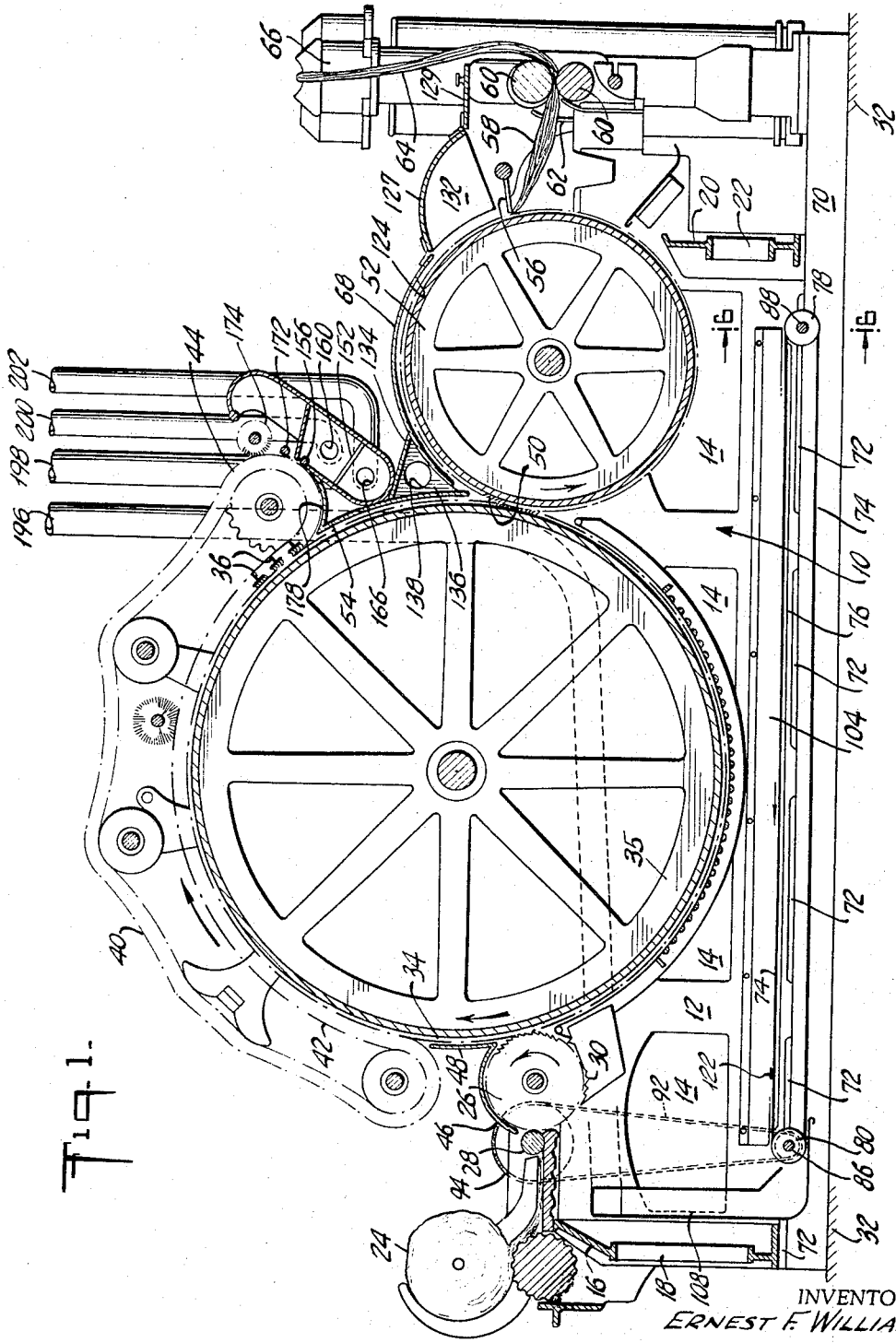
FIG. 1 is a side view in cross section of a carding machine showing one form of the invention.

FIG. 1 shows a carding machine comprised of a frame 10 having a side wall 12 with access doors 14 opening therethrough. A rear end wall 16 in frame 10 also has an access door 18, and a front end wall 20 is provided with an access door 22. At the left end of FIG. 1 a coiled lap 24 of fiber is shown being fed to lickerin 26 by feed roll 28. As the fiber is penetrated by the teeth 30 on the lickerin, waste material therein is thrown downward toward the floor 32 on which the carding machine rests. The fiber remaining on the lickerin is transferred to the wires 34 of the clothing on the cylinder 35. The cylinder, rotating clockwise as shown by the arrow in FIG. 1, carries the fibre at high speed past flats 36 which enclose a segment of the cylinder. The flats are connected to an endless chain 38 (best seen in FIG. 7) which is driven slowly by sprocket wheels in the direction of the arrow of FIG. 1. The flats comprise an upper flight 40 and a lower flight 42, with the flats in the lower flight actively carding the fiber. The flats pass from the lower to the upper flight through bight 44. The construction of the structure supporting the flats is such that they are almost in contact with each other when passing over the cylinder, and serve to prevent excessive fly-out of loose fibers and dirt. Nevertheless, there is some loss of fiber and dust into the air between the upper and lower flights of flats. Loss of fiber into the air from the lickerin and the adjacent portion of the cylinder is prevented by lickerin cover 46 and back plate 48, the latter extending upward to the point where the flats in the lower flight join the cylinder.

Fibers still adhering to the cylinder clothing after passing the flats are removed therefrom by the clothing 50 on the doffer 52, which rotates counterclockwise as shown by the arrow in FIG. 1. Front plate 54 covers the cylinder surface from the flats to the doffer. Fibers on the doffer clothing are carried to doffer comb 56 which oscillates rapidly through a small arc and strips the fibers from the doffer clothing, forming a web 58. The action of the doffer comb releases loose fibers into the air. Counter-rotating doffer calendar rolls 60, 60 draw the web through trumpet 62 where it is formed into sliver 64 which passes upward into coiler 66.

Portions of the doffer clothing which have passed the doffer comb may still retain some fibers or waste material. These portions pass under doffer cover 68. Any waste which may drop from the bottom of the cylinder or doffer as these elements rotate finds its way toward the floor between the side frames.

As the flats 36 leaves the lower flight 42 the wires of their clothing are embedded in a mass of short and tangled fibers known as "flat strips." The flat strips are more valuable than the waste which falls to the floor below the machine. They must be removed from the flats, and the mechanism for removal which will be described below constitutes part of the present invention.

The card machine structure so far described is conventional. In the usual machine the waste which falls to the floor within the machine frame 10 is removed sporadically by an operator who opens the necessary access doors and pulls it out. According to the present invention the carding machine is raised on a base 70 which may be of wood. The gaps between the base and the bottom of the machine frame are sealed with foam rubber strips 72 or the like. An endless belt 74 extends across from one side wall 12 to the other and substantially the full length of the machine frame. The upper flight of the belt is supported from beneath by a shelf 76 which may be of plywood. The bights of the belt pass around an idler sheave 78 and a driving sheave 80. These are held in position by ball bearings 82 and 84 which carry the axles 86 and 88 of the driving and idler sheaves respectively. The sheaves may be slightly crowned in order to center the belt. Sprocket 90 is rigidly attached to axle 86 and is meshed with roller chain 92. A second sprocket 94 is attached to and rotates with feed roll 28, driving roller chain 92. A belt speed of thirty-six inches per minute has been found satisfactorily and the size of the sprockets may be selected to achieve that speed.

The tension in belt 74 may be adjusted by shifting the position of ball bearings 84 which carry the idler sheave. The bearing housing 96 is clamped by the bolts 98 to an angle iron 100. The angle iron is fastened to base 70 by lag screws 102. The hole in the angle iron which receives the bolt 98 is elongated to allow lateral shifting of the position of the bearing housing relative to the angle iron.

A sheet metal flap 104 extends inward and downward from each side wall 12 to a position just above the surface of the belt. This flap prevents waste material from falling into the space between the edge 106 of the belt and the side wall. A belt cleaning suction duct 108 is located adjacent the driving sheave 80. This duct extends the full width of the belt. A rear wall 110 extends downward to join a bottom apron 112 which underlies the driving sheave and part of the lower flight of the belt. A front wall 114 joins an angle plate 116, the lower edge 118 of which is spaced three-quarters of an inch from the surface of the belt at approximately the same level as the axle 86. Side walls 120 connect the front and rear walls of the duct. A partial vacuum may be created in the duct by the fan and conduits to be described below. This vacuum sucks material from the surface of the belt 74 as the belt passes over the driving sheave. The bottom apron 112 helps to confine the major amount of the air flow to the gap between the belt and lower edge 118.

The belt 74 is of fabric with a smooth outer coating, as of rubber or plastic. A slick surface prevents the waste fibers from sticking to the belt surface and allows their removal by suction. The same slick surface, however, makes it possible for balls or clumps of waste to jam against angle plate 116 without being forced into the duct. The surface of the belt simply slides past such clumps. To alleviate this condition a fabric cleat 122 is sewn onto the belt across the width thereof. As this cleat passes the driver sheave, it forces any jammed clumps of material into the duct. It is sufficiently flexible to pass the bottom apron 112 without damage.

The belt and duct arrangement shown keeps the underside of the card machine clean with little attention. A reduction in the floating duct and lint leaving the machine also results as the duct creates a gentle inflow of air through the various openings in the frame.

The fly released by the doffer comb is removed by a second suction device. As may best be seen in FIGS. 1 and 9, the usual doffer cover 68 is retained, but in the illustrated machine it has been raised to create an air gap of approximately three quarters of an inch between the underside 124 of the doffer cover and the points 126 of the wires of the doffer clothing. The gap between the doffer cover in the raised position and the shrouds at the ends of the doffer is filled in to prevent air leakage. An arching hood 127 is connected by hinge 128 to the outer edge 130 of the doffer cover. The hood has end pieces 132. As shown, the hood is fabricated of a clear plastic, which allows inspection of the doffer and comb therethrough. 129 is a hinged plate carrying knob 129'. The plate is designed to protect the web 58 from draft of air which might break the web.

As shown in FIGS. 1 and 10, a sealing plate 134 extends from front plate 54 to the doffer cover 68 and forms, with these members, a suction channel of roughly triangular cross section. The ends of the suction channel are covered by end plates 136, the one shown having an outlet hole 138 therein adapted to be connected to the suction tubes which will be described below. As may best as seen in FIG. 10, the inner edge 140 of the doffer cover is spaced from the front plate 54, defining an entrance gap into the suction channel.

With the carding machine in operation a partial vacuum is created in the suction channel. This draws air from the space above the doffer comb into the air gap below the doffer cover and thence into the suction chamber. The hood 127 because of its size and arcuate shape collects air from above the web in a gentle, low velocity stream sufficient to entrain fly floating in this area without injuring the web 58. The same air, however, is markedly accelerated when it enters the air gap between the doffer wire and the underside of the doffer cover and passes through the air gap at considerable velocity. This keeps the entrained material from settling on the doffer. The high speed air flow also serves to clean the wires of the doffer clothing.

Two embodiments of the invention are shown in the drawings. They differ with respect to the suction device used in connection with the flat cleaning mechanism. FIGS. 1, 7 and 8 show a first construction. Flats 36, clogged with flat strips, pass around bight 44, driven by sprocket 142. The bight is adjacent suction duct 144 which may be made of transparent plastic in order to disclose the working parts. The suction duct 144 comprises a front wall 146, a rear wall 148, and end walls 150. A duct floor 152 and an inner shelf 154 join the front and rear walls. A metal reinforcing bar 156 extends along the rear wall to maintain its shape. Between the top of the reinforcing bar and the outer edge 158 of the inner shelf an opening into the suction duct defines a stripping slit. The stripping slit is approximately one quarter inch in width and extends the full length of the flats in close proximity to the points of the wires in the flats. One end wall is pierced by an outlet 160, which may be connected to a suction tube as will be more fully described below. When suction is applied, the in rush of air through the stripping slit will remove most of the flat strips from the flats. In order to equalize the flow in different portions of the stripping slit, a crossover duct 162 is provided below the suction duct. End wall 164 of the crossover duct is pierced by outlet 166. Adjacent the other end wall 168 an edge 170 of the floor 152 defines an opening between the suction duct 144 and the crossover duct 162. When suction is applied at the outlets 160 and 166, the waste from half the stripping slit leaves through one outlet and half through the other.

Some waste may pass the stripping slit without leaving the flats. This material is subject to the action of the conventional reciprocating comb 172 and then, if still not removed, to the bristles of a rotating nylon brush 174. Any waste removed by the comb or brush will be sucked into the stripping slit, since hood 176 promotes a flow of air past these elements toward the slit.

As an added precuation against fly, a curved shield 178 may be located between the rear wall 148 of the suction duct and the front plate 54. The shield closely abuts the path taken by the flats, and any material which drops from them is carried upward to the stripping slit, rather than getting into the air or falling on the front plate.

FIG. 10 shows a construction in which the flat strips are removed by a conventional reciprocating comb 180 and a rotating brush 182. These elements are surrounded by a suction hood 184 which extends the length of the flats. Outlet 186 in the suction hood collects any fly given off by the brush or comb, as well as the flat strips.

FIGS. 2 and 3 show a duct system which is capable of serving a number of carding machines. Motor 188 drives centrifugal "shave blade" fan 190, which creates a partial vacuum in manifold 192. Separate headers 194, 194', etc., branch off the manifold, one header for each machine. From each header four tubes branch out to the various suction ducts already described. Tube 196 connects with belt cleaning suction duct 108; tube 198 with outlet hole 138 in the suction channel which cleans the doffer, and tubes 200 and 202, respectively, to outlet 160 and outlet 166 in the cleaning mechanisms for the flats. In practice it has been found satisfactory to make tubes 196 and 198 three inches in diameter and tubes 200 and 202 two and one-quarter inches in diameter. Headers 194, 194', etc., are four inches in diameter. An air flow of four or five hundred cubic feet per minute per carding machine has been found satisfactory.

The air collected from the machines is blown into an air filter 204 of any standard type where the entrained waste is removed. The air is returned to the card room through woven filter bag 206.

It will be appreciated that the duct system illustrated mingles the waste collected from various portions of the carding machine. If it is desired to separate the relatively valuable card strips from the waste which is separated out by the lickerin, tube 196 may be lead to a separate filter system similar in its essentials to that illustrated.

The invention having been described, the following is claimed:

1. In a flat card having a cylinder, an endless chain of clothed flats having a lower flight passing over a portion of the cylinder, said chain passing from the lower to the upper flight in a bight around a sprocket, a reciprocable comb at the bight adapted to remove flat strips from the flats, and a rotatable brush at the bight above the reciprocable comb adapted to brush the flats, the improvement comprising (a) a hood partially surrounding the brush and reciprocable comb and placed to intercept and confine material brushes or combed from the flats by said brush and comb;
(b) an inner shelf within the hood extending beneath the brush and reciprocable comb and having an outer edge in close proximity to the path of the ends of wires on the flats at the bight;
(c) a suction duct beneath the inner shelf, said duct being defined by the underside of the inner shelf, a front wall, a rear wall proximate to the bight, a duct floor, and first and second end walls;
(d) said hood having a stripping slit extending the width of the flats at the outer edge of the inner shelf, said stripping slit being a passageway into the suction duct extending in a direction perpendicular to the path of the flats at the strippling slit;
(e) said first end wall having an outlet therein;
(f) walls defining a crossover duct extending below the duct floor, said crossover duct having an outlet adjacent the outlet in the first end wall;
(g) said hood having a passageway between the suction duct and the crossover duct at a location adjacent the second end wall.

References Cited

UNITED STATES PATENTS

| | | | |
|---|---|---|---|
| 1,338,651 | 4/1920 | Goldsmith | 19—109 |
| 2,959,824 | 11/1960 | Asti et al. | 19—107 |

FOREIGN PATENTS

| | | |
|---|---|---|
| 548,777 | 10/1922 | France. |
| 6,633 | of 1913 | Great Britain. |
| 20,065 | of 1914 | Great Britain. |
| 21,672 | of 1898 | Great Britain. |
| 26,977 | of 1911 | Great Britain. |
| 919,694 | 2/1963 | Great Britain. |

DARSEY NEWTON, *Primary Examiner.*